US010894567B2

(12) United States Patent
Bradley

(10) Patent No.: US 10,894,567 B2
(45) Date of Patent: Jan. 19, 2021

(54) AERODYNAMIC SYSTEM WITH DUAL ZONE FAIRING FOR TRUCK

(71) Applicant: Compagnie Generale des Etablissements Michelin, Clermont-Ferrand (FR)

(72) Inventor: Calvin Rhett Bradley, Greenville, SC (US)

(*) Notice: Subject to any disclaimer, the term of this patent is extended or adjusted under 35 U.S.C. 154(b) by 58 days.

(21) Appl. No.: 16/479,402

(22) PCT Filed: Feb. 3, 2017

(86) PCT No.: PCT/US2016/064200
§ 371 (c)(1),
(2) Date: Jul. 19, 2019

(87) PCT Pub. No.: WO2018/143907
PCT Pub. Date: Aug. 9, 2018

(65) Prior Publication Data
US 2019/0382059 A1    Dec. 19, 2019

(51) Int. Cl.
*B60J 9/00* (2006.01)
*B62D 35/00* (2006.01)

(52) U.S. Cl.
CPC ......... *B62D 35/001* (2013.01); *B62D 35/008* (2013.01)

(58) Field of Classification Search
CPC .... B62D 35/001; B62D 35/02; B62D 35/008; B62D 25/168; E21B 21/08; E21B 21/001; B60Y 2200/14; B60K 15/077; B60R 19/565
See application file for complete search history.

(56) References Cited

U.S. PATENT DOCUMENTS

| | | | |
|---|---|---|---|
| 8,177,286 B2* | 5/2012 | Brown | B62D 25/168 296/180.4 |
| 8,376,450 B1 | 2/2013 | Long et al. | |
| 9,139,241 B1 | 9/2015 | Smith | |
| 2009/0195017 A1 | 8/2009 | Wood | |

(Continued)

FOREIGN PATENT DOCUMENTS

GB    2538166 A    11/2016

OTHER PUBLICATIONS

European Patent Office; International Search Report and Written Opinion for patent application PCT/US2016/064200; dated Sep. 14, 2017; Publisher: European Patent Office, Rijswijk, Netherlands, pp. 1-11, enclosed.

*Primary Examiner* — Kiran B Patel
(74) *Attorney, Agent, or Firm* — Neal P. Pierotti

(57) ABSTRACT

An aerodynamic system for a truck (12) is provided that has a faring (14) carried by the truck with an outer surface (24) that is an air flow surface across which air flows when the truck is moving forward. The faring has a tailing end with a first kick out (22) that has a first kick out exit surface (24) oriented at a first angle with respect to the air flow surface. The tailing end has a second kick out (28) with a second kick out exit surface (30) oriented at a second angle with respect to the air flow surface. The first angle is different than the second angle. The truck has a longitudinal axis, a longitudinal direction and a vertical direction. The air flow surface is located forward from the tailing end in the longitudinal direction, and the first kick out is located higher than the second kick out in the vertical direction.

15 Claims, 7 Drawing Sheets

(56) References Cited

U.S. PATENT DOCUMENTS

| | | | |
|---|---|---|---|
| 2009/0212596 A1* | 8/2009 | Reiman | B62D 35/001 296/180.4 |
| 2011/0068605 A1* | 3/2011 | Domo | B62D 35/001 296/180.4 |
| 2011/0204677 A1 | 8/2011 | Wood et al. | |
| 2012/0074728 A1* | 3/2012 | Senatro | B62D 35/02 296/180.4 |
| 2012/0153668 A1* | 6/2012 | van Raemdonck | B62D 35/001 296/180.4 |
| 2014/0117712 A1 | 5/2014 | Butler et al. | |
| 2014/0159419 A1* | 6/2014 | Baker | B62D 35/001 296/180.4 |
| 2014/0265438 A1* | 9/2014 | Kronemeyer | B62D 35/001 296/180.4 |
| 2015/0015027 A1* | 1/2015 | Wirth | B62D 35/001 296/180.2 |
| 2015/0259014 A1* | 9/2015 | Baker | B62D 35/008 296/180.4 |
| 2015/0375811 A1* | 12/2015 | Magee | B62D 35/02 296/180.1 |
| 2016/0096558 A1* | 4/2016 | Bassily | B62D 35/001 296/180.4 |
| 2016/0121940 A1* | 5/2016 | Courtney | B62D 35/001 296/180.4 |
| 2017/0008576 A1* | 1/2017 | Petersson | B62D 35/001 |
| 2017/0029044 A1* | 2/2017 | Senatro | B62D 35/001 |
| 2017/0066487 A1* | 3/2017 | Boivin | B62D 35/001 |
| 2017/0174271 A1* | 6/2017 | Baker | B62D 35/008 |
| 2017/0217506 A1* | 8/2017 | Bezner | B62D 35/02 |
| 2018/0043944 A1* | 2/2018 | Magee | B62D 35/02 |
| 2018/0072354 A1 | 3/2018 | Cosme | |
| 2018/0093719 A1* | 4/2018 | Emery | B62D 35/008 |
| 2018/0099632 A1* | 4/2018 | Fortier | B60R 21/34 |
| 2018/0118143 A1* | 5/2018 | Ponder | B60R 19/565 |
| 2018/0281875 A1* | 10/2018 | Macherel | B62D 35/001 |
| 2018/0304941 A1* | 10/2018 | Ehrlich | B62D 35/001 |
| 2018/0370580 A1* | 12/2018 | Butler | B62D 35/008 |
| 2019/0077470 A1* | 3/2019 | Kunkel | B62D 35/001 |
| 2019/0144052 A1* | 5/2019 | Magee | B62D 35/02 296/180.2 |
| 2019/0168827 A1* | 6/2019 | Magee | B62D 25/168 |
| 2019/0184925 A1* | 6/2019 | Roush | B60R 19/565 |
| 2020/0039587 A1* | 2/2020 | Bradley | B62D 35/001 |
| 2020/0122781 A1* | 4/2020 | Magee | B62D 35/02 |
| 2020/0231226 A1* | 7/2020 | Senatro | B62D 35/008 |
| 2020/0239088 A1* | 7/2020 | Kapetanovic | B62D 33/04 |
| 2020/0262493 A1* | 8/2020 | Butler | B62D 35/001 |
| 2020/0269789 A1* | 8/2020 | Ponder | B62D 35/008 |
| 2020/0290687 A1* | 9/2020 | Magee | B62D 35/007 |

* cited by examiner

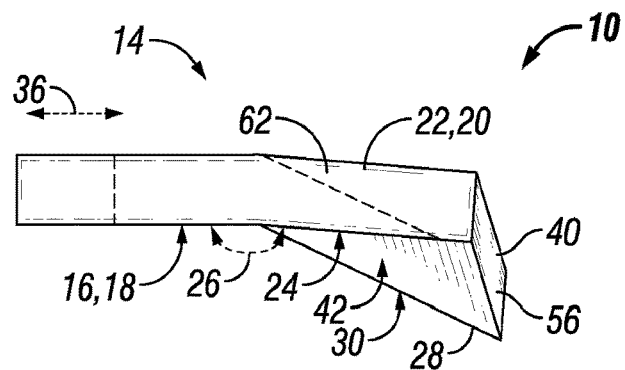
FIG. 4
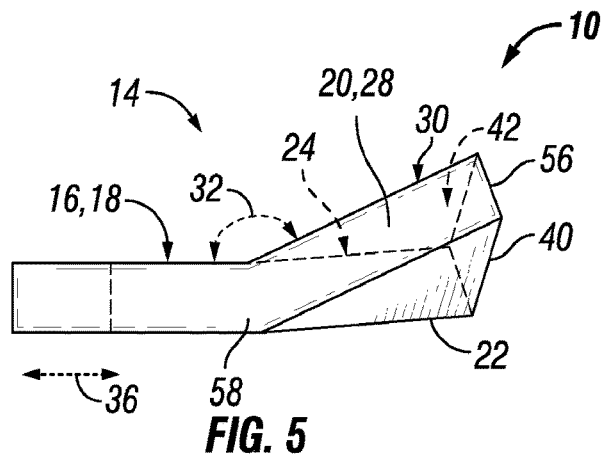
FIG. 5
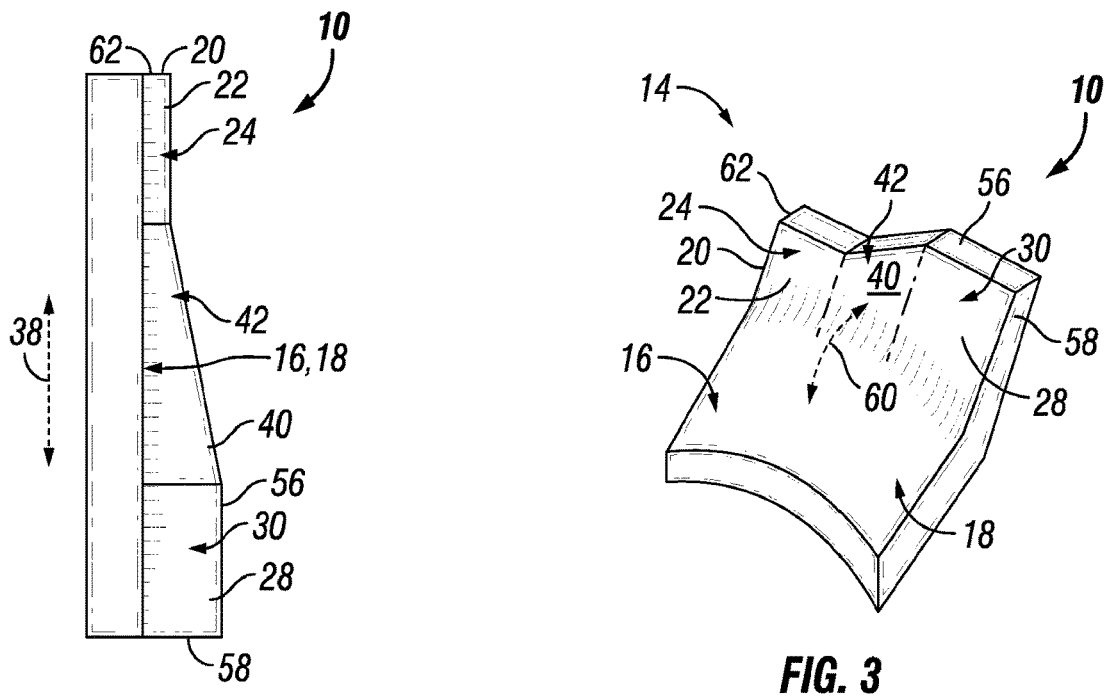
FIG. 6
FIG. 3

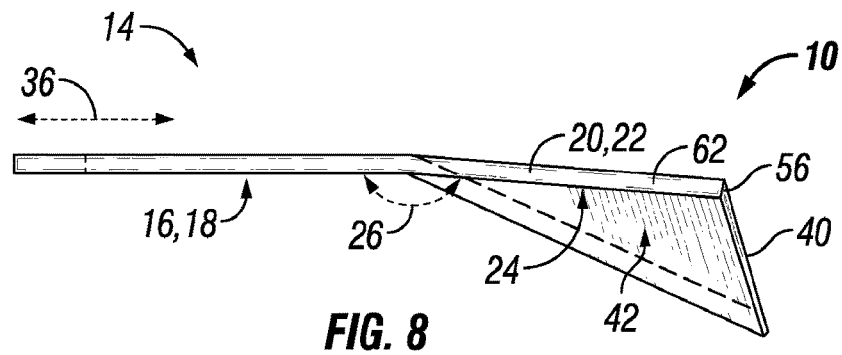
FIG. 8
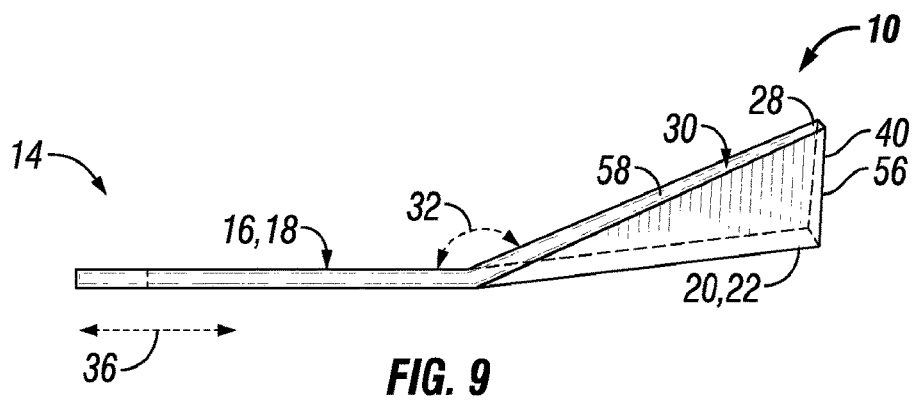
FIG. 9
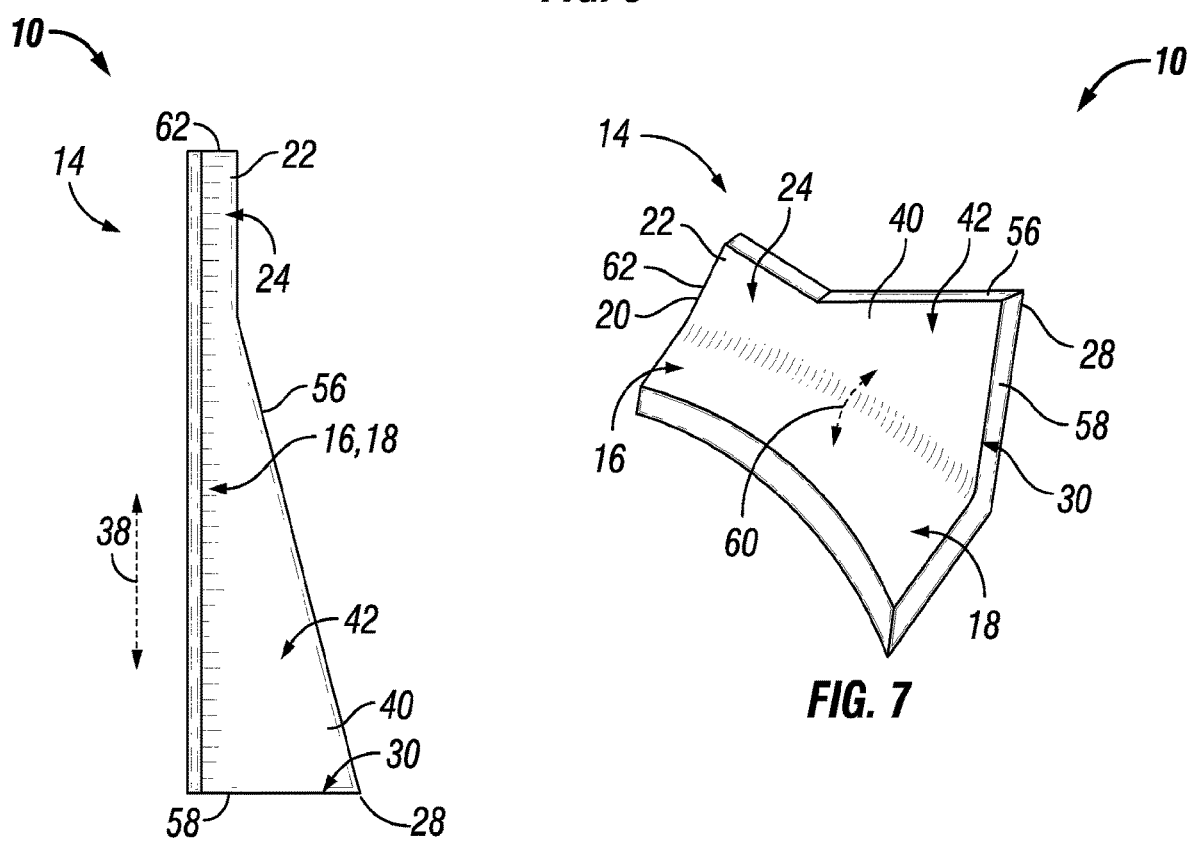
FIG. 10
FIG. 7

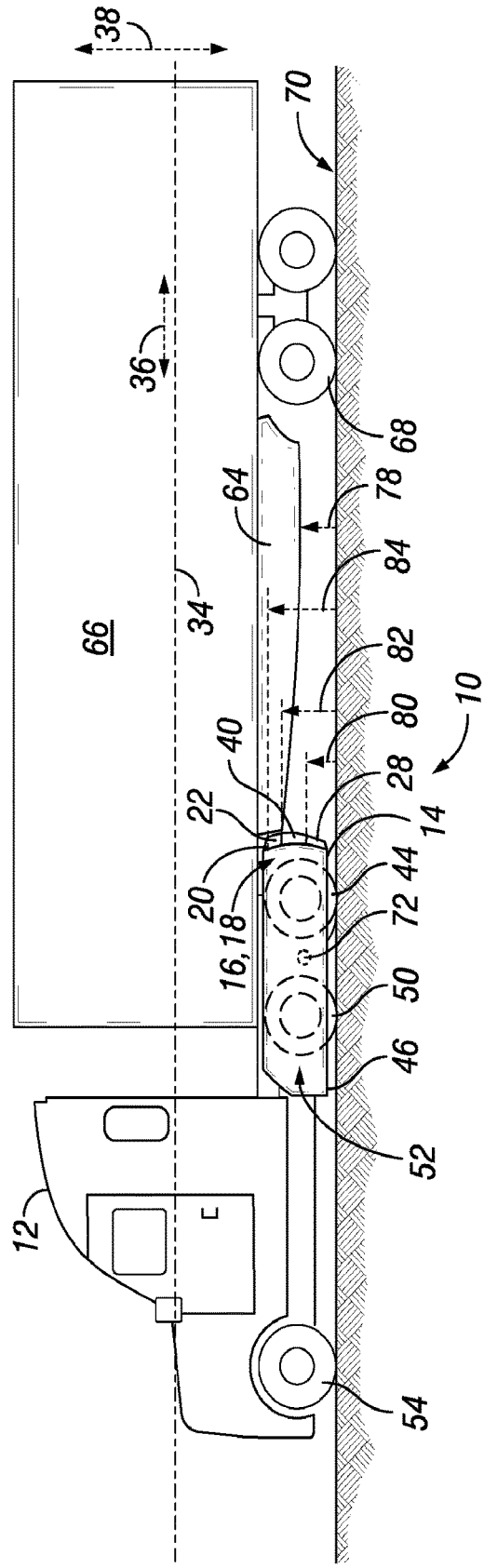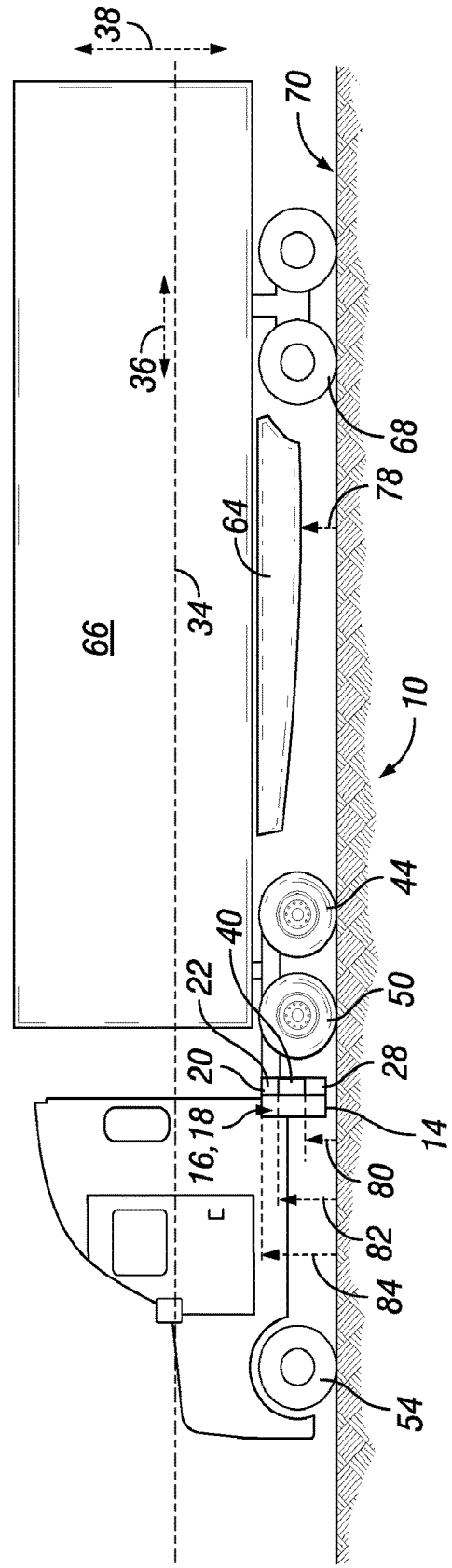

AERODYNAMIC SYSTEM WITH DUAL ZONE FAIRING FOR TRUCK

CROSS-REFERENCE TO RELATED APPLICATION

The present application is a 35 U.S.C. § 371 application of PCT/US16/64200 filed on Feb. 3, 2017, and entitled "Aerodynamic System with Dual Zone Faring for Truck." PCT/US16/64200 is incorporated by reference herein in its entirety for all purposes.

FIELD OF THE INVENTION

The subject matter of the present invention relates to aerodynamic systems for trucks that pull trailers. More particularly, the present application involves a dual zone faring for a truck that causes airflow off the faring to be directed in two different manners in order to improve aerodynamic properties of the tractor trailer.

BACKGROUND OF THE INVENTION

The improvement of tractor trailer aerodynamics leads to reduced costs of driving the tractor trailer and improves environmental impacts. It is known to provide aerodynamic features onto the sides of tractor trailers for these purposes. For example, chassis skirts that cover the fuel tank of trucks, and trailer skirts that cover the sides below the trailer, function by preventing some of the high velocity air developed from travel from going under the tractor trailer and impacting the wheels, axles, and other structures. The trailer skirt does not extend forward all the way to the tires of the truck because of the connection between the truck and the trailer that requires space to be present to accommodate turning of the truck relative to the trailer. This gap may cause drag to be imparted onto the trailer during travel. Still further, due to the fact that trailer skirts do not extend as far down in the vertical direction as structures on the truck, such as fenders on the truck, air flow in these regions may negatively impact the trailer and create additional drag. The presence of trailer skirts improves the aerodynamic properties of the tractor trailer, but their presence still air flow generated during forward movement of the tractor trailer to cause drag on the vehicle. Aerodynamic features upstream of the trailer skirt have a constant kick out along their entire vertical length which does not address these different air flow patterns relative to the trailer skirt. Additionally, aerodynamic features upstream of the trailer skirt have designs that reduce localized drag at the tractor, but are not addressed towards the drag associated with the trailer. As such, room for variation and improvement exists in the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 3 is a perspective view of a faring of the aerodynamic system.

FIG. 4 is a top view of FIG. 3.

FIG. 5 is a bottom view of FIG. 3.

FIG. 6 is a front view of FIG. 3.

FIG. 7 is a perspective view of a faring of the aerodynamic system in accordance with one exemplary embodiment.

FIG. 8 is a top view of FIG. 7.

FIG. 9 is a bottom view of FIG. 7.

FIG. 10 is a front view of FIG. 7.

FIG. 21 is a side view of the aerodynamic system in which the faring is located behind the front wheel and in front of the intermediate wheel of the truck.

FIG. 22 is a side view of the aerodynamic system that includes a skirt onto which the faring is incorporated.

The use of identical or similar reference numerals in different figures denotes identical or similar features.

DETAILED DESCRIPTION OF THE INVENTION

Figure 1:
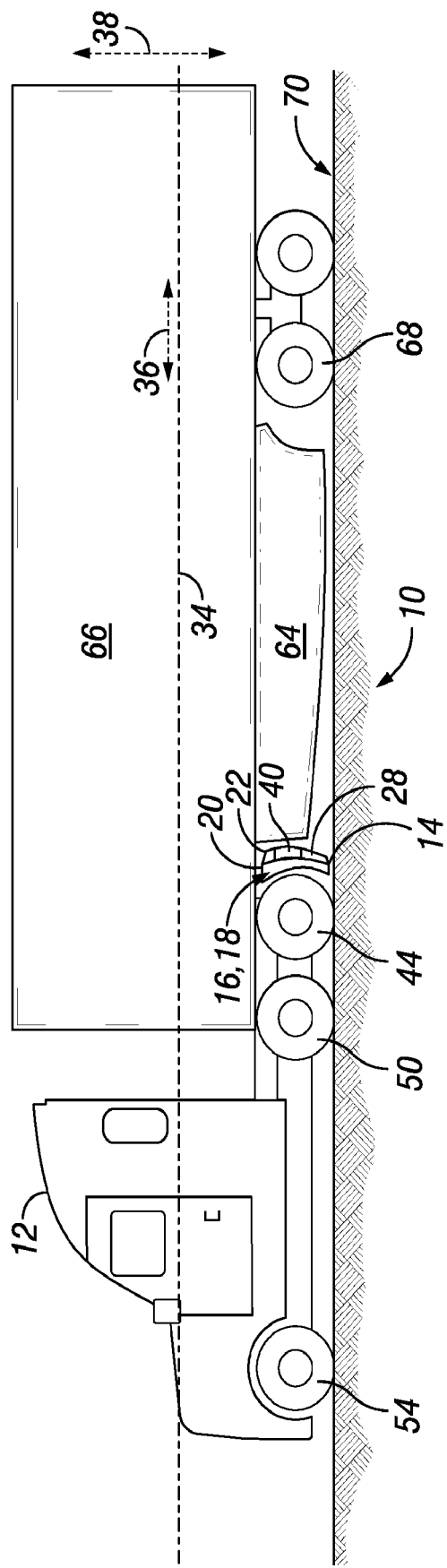
FIG. 1 is a side view of the aerodynamic system with a truck and faring.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

An aerodynamic system 10 is provided that includes a faring 14 that is used to direct the flow of air passing over the faring 14 when a truck 12 is driven. The faring 14 has a geometry that causes a dual air flow pattern to be developed that interacts with a skirt 64 carried by the truck 12. The air flow engaging the skirt 64 from the faring 14 is in one direction or pattern, and the air flow from the faring 14 that flows under the skirt 64 is in a different pattern or direction. The faring 14 may be designed so that one portion of it creates a bigger kick out of air flow than another portion of the faring 14. By creating a dual zone air flow off of the faring 14, the aerodynamic system 10 is optimized for interaction with the skirt 64 so that the truck 12 has better aerodynamic properties. The presence of the trailer skirt 64 requires less "kick out" of air in front of the trailer skirt 64 in the longitudinal direction 36 by the faring 14. However, the faring 14 will extend lower in the vertical direction 38 than does the vertical extent of the trailer skirt 64. This area will require a different amount of "kick out" because there is no trailer skirt 64 at this vertical height. A larger amount of air "kick out" is present at the lower vertical position of the faring 14. This larger "kick out" creates greater drag by the faring 14, but it results in aerodynamic gains at the back of the trailer 66 which more than compensates for the aerodynamic losses at the truck 12 due to the greater faring 14 kick out at its bottom. As such, a dual air zone arrangement of the faring 14 achieves aerodynamic properties that result in less drag on the tractor trailer vehicle.

FIG. 1 shows the faring 14 incorporated into a truck 12. The truck 12 has a longitudinal axis 34 that extends in a longitudinal direction 36 of the truck 12, which is the direction of travel forward of the truck 12 when driven in a straight line. The faring 14 is located rearward of a back tire wheel 44 of the truck 12 in the longitudinal direction 36. The faring 14 is forward of a skirt 64 of the aerodynamic system 10 that is attached to and located under a trailer 66 of the tractor trailer truck 12. The faring 14 is spaced from the skirt 64 in the longitudinal direction 36 and does not engage the skirt 64. The skirt 64 does not extend in the longitudinal direction 36 all the way to the truck 12 because the truck 12 turns in relation to the trailer 66 and room to accommodate this turning is needed. The faring 14 is located under the trailer 66 in the vertical direction 38 of the truck 12. In addition to the back tire wheel 44, the truck has a series of front truck wheels 54 and intermediate truck wheels 50. The intermediate truck wheels 50 are located between the front truck wheels 54 and the back tire wheels 44 in the longitudinal direction 36. The trailer 66 has a series of trailer wheels 68 that are attached to the trailer 66 and are located rearward of the wheels 54, 50, 44 of the truck 12. The various wheels 44, 50, 54, 68 rest upon the ground 70.

Figure 2:
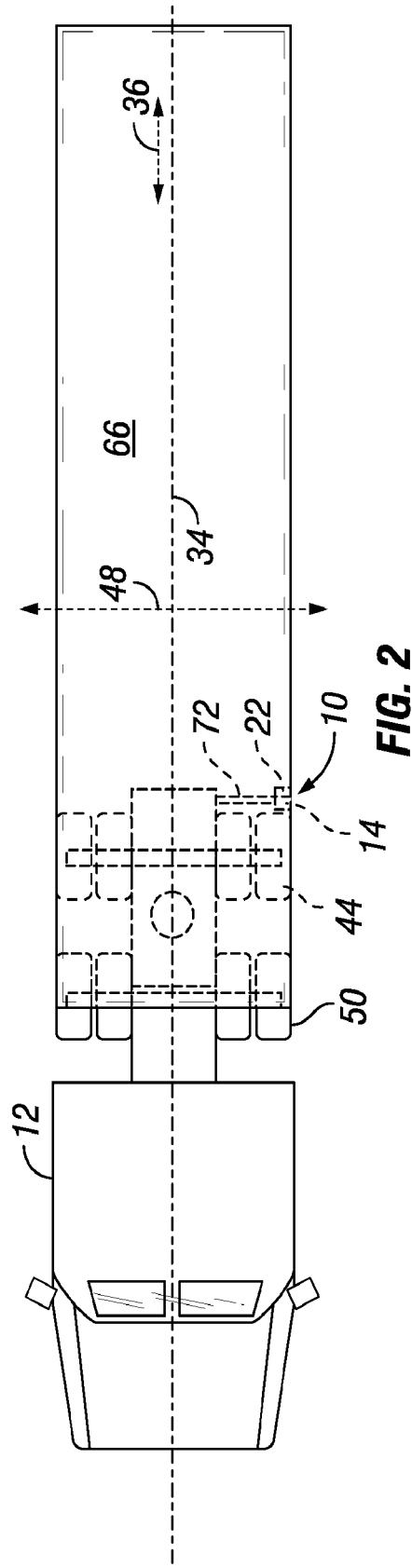
FIG. 2 is a top view of the aerodynamic system of FIG. 1.
Figure 12:
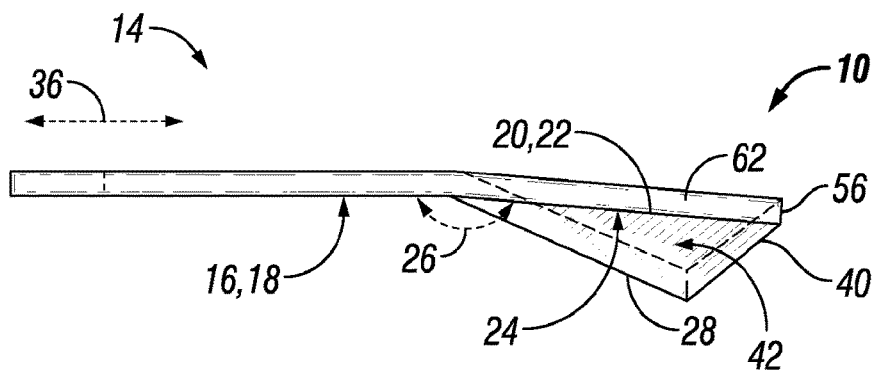
FIG. 12 is a top view of FIG. 11.
Figure 13:
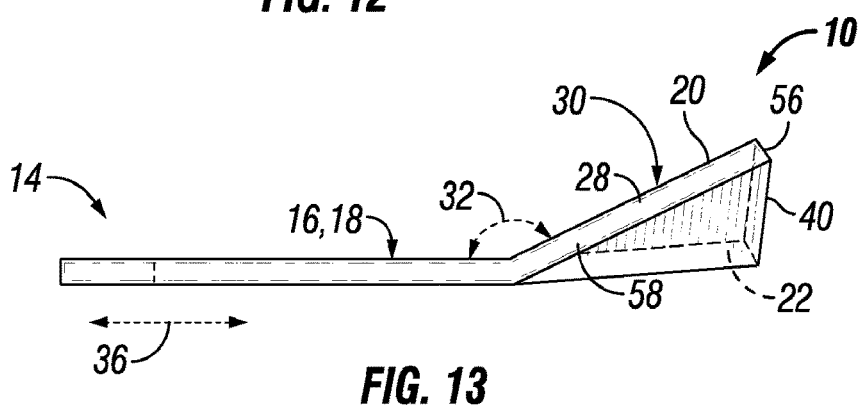
FIG. 13 is a bottom view of FIG. 11.
Figure 14:
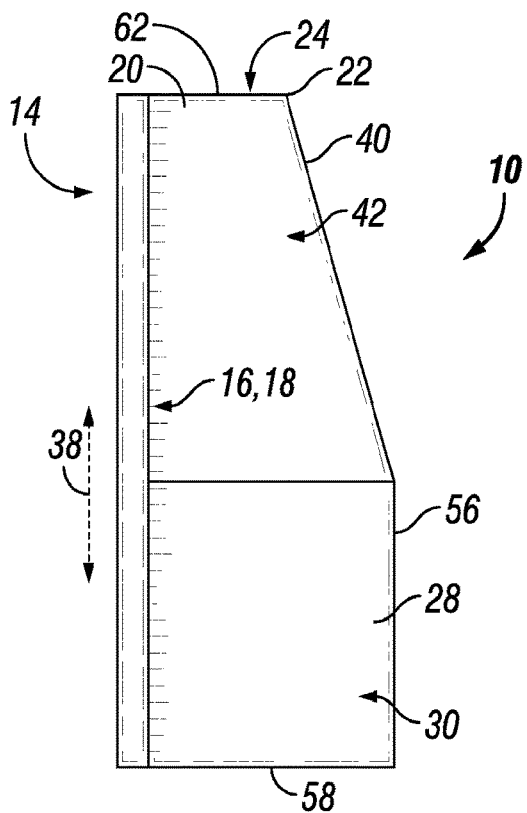
FIG. 14 is a front view of FIG. 11.
Figure 11:
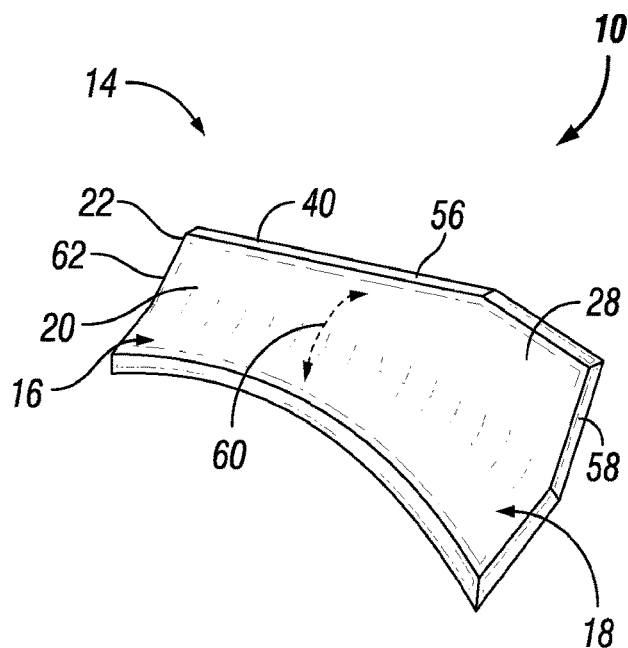
FIG. 11 is a perspective view of a faring of the aerodynamic system in accordance with a different exemplary embodiment.
Figure 16:
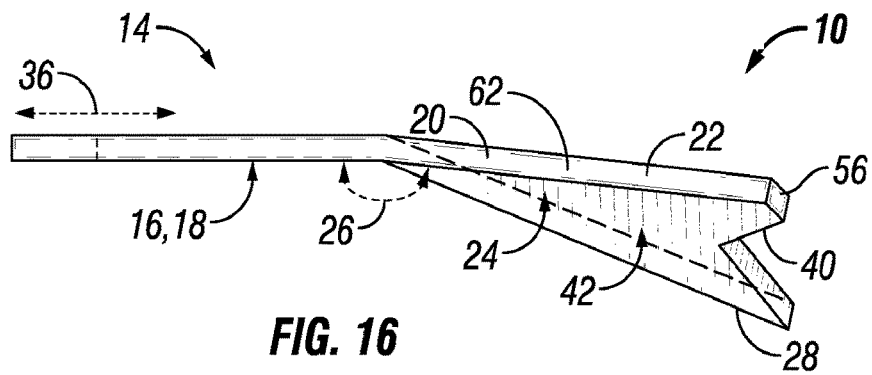
FIG. 16 is a top view of FIG. 15.
Figure 17:
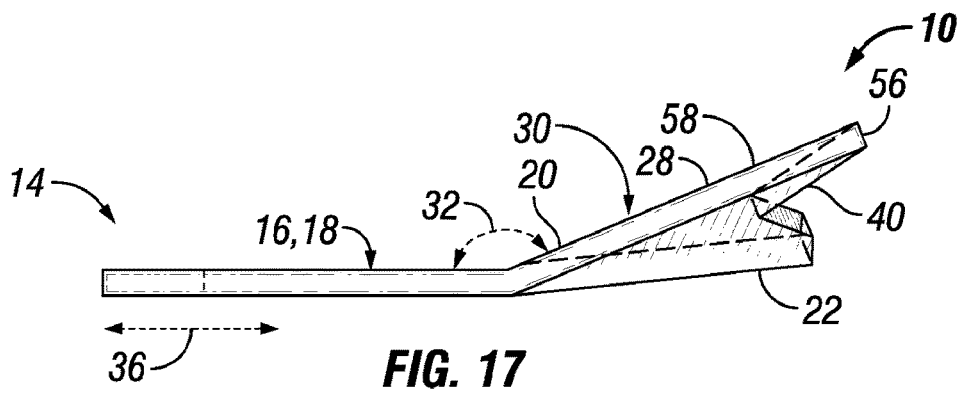
FIG. 17 is a bottom view of FIG. 15.
Figure 18:
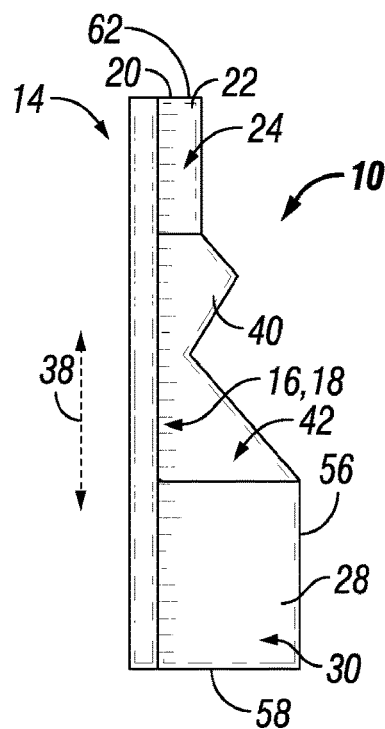
FIG. 18 is a front view of FIG. 15.
Figure 15:
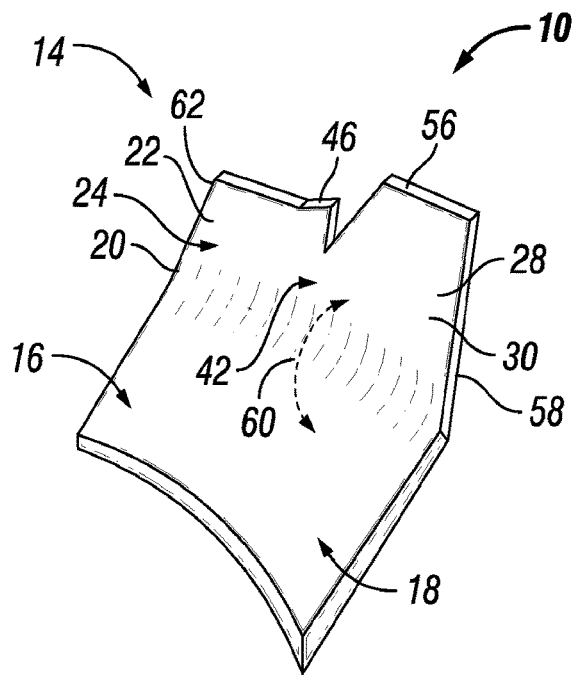
FIG. 15 is a perspective view of a faring of the aerodynamic system in accordance with yet another exemplary embodiment.

FIG. 2 is a top view of the aerodynamic system 10 of FIG. 1 and shows a portion of the components in hidden lines. The truck 12 has four intermediate truck wheels 50 and four back tire wheels 44, but it is to be understood that in other exemplary embodiments other amounts can be present. The faring 14 is shown as being located completely under the trailer 66 so that no portion of the faring 14 extends beyond the trailer 66 in the lateral direction 48. In this regard, no portion of the faring 14 is outboard of the trailer 66 in the lateral direction 48. In other embodiments, all of the faring 14 may be outboard from the trailer 66 in the lateral direction 48, or some of the faring 14 may be outboard while other portions inboard of the trailer 66 in the lateral direction 48. The faring 14 has a width in the lateral direction 48, and the faring 14 is attached to a rear portion of the truck 12 by a mounting arm 72. The faring 14 may be attached to the mounting arm 72 through the use of bolts, welds, screws, snaps, or any other type of mechanical fastener. Although shown as being attached to the truck 12, in other exemplary embodiments, the faring 14 may be attached to the trailer 66.

FIGS. 3-6 show the faring 14 from FIGS. 1 and 2 in various views. The outer surface 16 of the faring 14 is the portion of the faring 14 that is oriented and faces outboard in the lateral direction 48. The outer surface 16 defines an air flow surface 18 over which air flow moves when the truck 12 is driven forward in the longitudinal direction 36. The air flow surface 18 may include various features, grooves, depressions, or projections on it and need not be a flat surface in different exemplary embodiments. The faring 14 has a tailing end 20 that is located rearward from the air flow surface 18 in the longitudinal direction 36. The tailing end 20 may be integrally formed with the air flow surface 18 so that they are one integral piece, or these various components 18, 20 can be made out of multiple pieces that are attached to one another. The tailing end 20 extends in the longitudinal direction 36, and extends in the vertical direction 38 from a bottom terminal end 58 of the tailing end 20 to a top terminal end 62 of the tailing end 20. The tailing end 20 likewise has a terminal end 56 that is the terminal end of the tailing end 20 opposite from the terminal end of the tailing end that engages the air flow surface 18. The terminal end 56 may also be a terminal end of the fairing 14. The tailing end 20 is arranged so that it has a different geometry at one or more portions between the terminal ends 58, 62 so that at least two different air flow patterns may be realized upon the air flowing off of the terminal end 56 and leaving the faring 14.

The tailing end 20 has a first kick out 22 and a second kick out 28. A transition zone 40 extends between the first kick out 22 and the second kick out 28 and is also a portion of the tailing end 20. The first kick out 22 engages and extends from the air flow surface 18 in the longitudinal direction 36 to the terminal end 56 of the tailing end 20. The first kick out 22 can be shaped and sized in any manner, but as shown in the embodiment in FIGS. 3-6 has a flat surface without any other features. The first kick out 22 has a first kick out exit surface 24 that is located on the outer surface 16 and across which air flows. The first kick out exit surface 24 extends over the entire outer surface 16 of the first kick out 22 as shown. Air flowing over the faring 14 will first engage the air flow surface 18 and then flowing backwards in the longitudinal direction 36 will engage the first kick out exit surface 24 and then exit off of the first kick out exit surface 24 to exit the faring 14.

The first kick out exit surface 24 is oriented at a first angle 26 to the air flow surface 18. The first angle 26 is 175 degrees, but in other embodiments may be from 170 degrees to 175 degrees. The first angle 26 may be at different degrees in yet other exemplary embodiments. The first angle 26 causes the air flowing across and then off of the first kick out exit surface 24 to flow outboard in the lateral direction 48. The first kick out exit surface 24 is located at the top of the faring 14 in the vertical direction 38 and the top terminal end 62 is located at the first kick out 22.

The second kick out 28 extends from the air flow surface 18 in the longitudinal direction 36 to the terminal end 56. The second kick out 28 is located at the bottom of the tailing end 20, and is at the bottom terminal end 58 of the tailing end 20 and extends upwards in the vertical direction 38 therefrom. The second kick out 28 has a second kick out exit surface 30 that extends across the entire outer surface of the second kick out 28. In other arrangements, the second kick out exit surface 30 may extend over less than the entire outer surface of the second kick out 28. The second kick out exit surface 30 is oriented at a second angle 32 to the air flow surface 18. As shown, the second angle 32 is 157 degrees. In other embodiments, the second angle 32 may be from 157 degrees to 170 degrees. In yet other arrangements, the second angle 32 can be of a different degree. The second angle 32 is different from the first angle 26. Air flow will travel across the air flow surface 18 and then onto the second kick out exit surface 30 and then off of the fairing 14. The second angle 32 will cause the air flow to exit at a different angle and thus in a different direction and pattern than the air flow exiting the first kick out exit surface 24. The second angle 32 is greater than the first angle 26, and the air flow exiting the second kick out exit surface 30 will be directed more outboard in the lateral direction 48 than the air flow exiting the first kick out exit surface 24. In this manner, two different patterns or directions of air flow will be created by the faring 14 so that their interaction or non-interaction with the trailer skirt 64 can be enhanced to increase aerodynamic performance The first kick out 22 is not as great because less kick out is required to get air flow to flow around the gap between the faring 14 and the trailer skirt 64. As such, some degree of kick out from the first kick out 22 is present in order to help bridge the gap between the truck 12 and the trailer skirt 64. A greater amount of kick out is incorporated into the second kick out 28 because this lower area may not have a trailer skirt 64 present to deflect flow downstream, and thus the second kick out 28 may be arranged to deflect as much air as possible past the truck 12 and trailer 66.

The tailing end 20 includes both the first kick out 22 and the second kick out 28 along a portion of the length of the tailing end in the vertical direction 38. The first kick out 22 and second kick out 28 are separated some distance from one another. A transition zone 40 is present between the first and second kick outs 22, 28 and has a transition zone exit surface 42 that is oriented at a transition zone exit surface angle 60. The angle 60 can be different than the first and second angles 26, 32 and may change in magnitude as it extends in the vertical direction between the first and second kick outs 22, 28. The transition zone exit surface 42 extends across the entire upper surface of the transition zone 40, but it is to be understood that in other arrangements of the fairing 14 that the transition zone exit surface 42 is only present on a portion of the transition zone 40. In other exemplary embodiments, the transition zone 40 is not present, and instead a space is present between the first kick out 22 and the second kick out 28. In yet other arrangements, the first kick out 22 and second kick out 28 are next to and engage one another and a transition zone 40 is not present.

The faring 14 can be arranged in a variety of manners in accordance with other exemplary embodiments of the aerodynamic system 10. FIGS. 7-10 show one such embodiment in which the first kick out exit surface 24 again covers the entire upper surface of the first kick out 22, and in which the first kick out 22 extends along a length of the tailing end 20 in the vertical direction 38. The second kick out 28 is located at the bottom of the tailing end 20 at the bottom terminal end 58 and extends over an extremely small portion of the length of the tailing end 20 in the vertical direction 38. In this regard, the second kick out 28 is at the very bottom and can be thought of as being just the bottom edge of the tailing end 20. The second kick out exit surface 30 is this very small portion or edge, and can cover the entire surface or edge of the upper surface of the second kick out 28. The transition zone 40 extends a greater distance along the trailing end 20 than either the first or second kick outs 22, 28. The first angle 26 and second angle 32 are different from one another, and the transition zone exit surface angle 60 changes at a constant rate from the second kick out exit surface 30 to its engagement with the first kick out exit surface 24. The angle that the tailing end 20 takes in the transition zone 40 is a gradual angle from the second kick out 28 to the first kick out 22 and the air flow pattern developed off of the faring 14 will be different depending upon the vertical location of the air exiting the faring 14 along the terminal end 56.

An alternative arrangement of the aerodynamic system 10 is shown with reference to FIGS. 11-14 in which the first kick out 22 is located at the top of the tailing end 20 and extends only a very small distance from the top terminal end 62 along the tailing end 20 in the vertical direction 38. The second kick out 28 has a second kick out exit surface 30 along its entire upper surface that extends along a length of the tailing end 20 in the vertical direction 38. The entire second kick out exit surface 30 is oriented at a second angle 32 to the air flow surface 18. The transition zone exit surface 42 is oriented at a transition zone exit surface angle 60 that changes in magnitude at a gradual, constant rate from its junctions with the second kick out exit surface 30 and the first kick out exit surface 24. The terminal end 56 in the transition zone 40 is thus a linear line. The arrangement of the faring 14 in this exemplary embodiment is essentially the opposite from the one previously described with respect to FIGS. 7-10.

Another exemplary embodiment of the faring 14 is shown in FIGS. 15-18 in which the faring 14 is provided with first and second kick outs 22, 28 that are essentially similar to those discussed previously with respect to FIGS. 3-6. The transition zone 40 does not feature a gradual change in transition zone exit surface angle 60, but instead is irregular in shape at the terminal end 56. The transition zone exit surface angle 60 may be the same or different at different locations on the transition zone exit surface 42, and the extent of the terminal end 56 in the outboard direction in the transition zone 42 decrease then increase and then decreases in the vertical direction 38 away from the second kick out 28. The transition zone 40 may thus be irregular in shape in accordance with various exemplary embodiments and need not have the same angle 60 along its entire transition zone exit surface 42, and need not have a linear shape at the terminal end 56.

Figure 20:
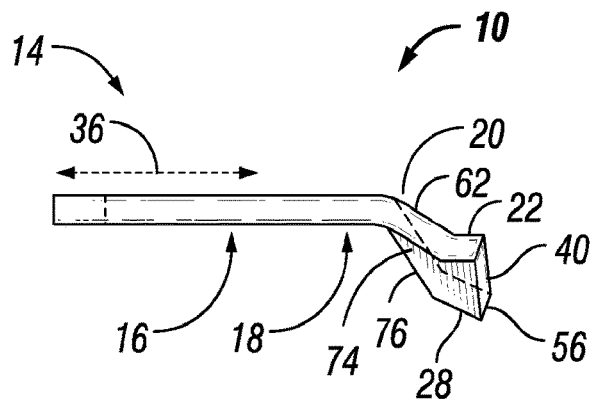
FIG. 20 is a top view of the faring of FIG. 19.
Figure 19:
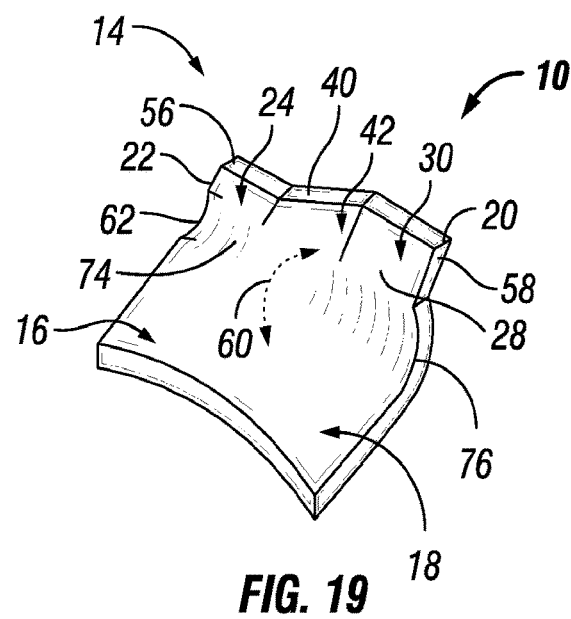
FIG. 19 is a perspective view of a faring of the aerodynamic system in yet another embodiment.

FIGS. 19 and 20 show an alternative exemplary embodiment of the faring 14 that has a first kick out 22 and a second kick out 28 with a transition zone 40 between the first and second kick outs 22, 28. The first kick out 22 has a first kick out exit surface 24 located near the terminal end 56 that is planar. The first kick out 22 also has a concave surface 74 that extends from the air flow surface 18 to the first kick out exit surface 24. This concave surface 74 is not at the first angle 26, but the first kick out exit surface 24 is at the first angle 26 to the air flow surface 18. As such, the first kick out 22 may include various features and differently shaped surfaces so long it has a surface 24, that may or may not be planar, that is oriented at the first angle 26. The second kick out 28 also has a concave surface 76 that engages the air flow surface 18 on one end and the second kick out exit surface 30 on the opposite end. The concave surface 76 is not at the second angle 32 to the air flow surface 18, but the second kick out exit surface 30 is in fact oriented at the second angle 32 to the air flow surface 18. In other embodiments, the kick outs 22, 28 could have convex surfaces, ribs, grooves, or any other feature. The transition zone 40 has a transition zone exit surface 42 oriented at a transition zone exit surface angle 60 that can change gradually from the second 28 to the first kick out 22. The transition zone 40 may also have a concave surface feature, or may be flat in other versions. The transition zone 40 may have a length in the vertical direction 38 that is the same as, less than, or greater than the lengths of the first and second kick outs 22, 28 in the vertical direction 38. In a similar manner, the first kick out 22 may have a length in the vertical direction 38 that is the same as, less than, or greater than the length of the second kick out 28 in the vertical direction 38. The longitudinal lengths of these members 22, 28 and 40 may be the same as or different from one another in other exemplary embodiments.

The aerodynamic system 10 need not include the faring 14 behind the back tire wheel 44 in all embodiments. FIG. 21 shows an embodiment of the aerodynamic system 10 in which the faring 14 is located rearward of the front truck wheel 54 but forward of both the intermediate truck wheel 50 and the back tire wheel 44 in the longitudinal direction 36. The faring 14 is proximate to the intermediate truck wheel 50 and is located directly in front of this wheel 50 in the longitudinal direction 36 so as to be located much closer to the intermediate truck wheel 50 than the front truck wheel 54. The faring 14 is spaced from the front truck wheel 54 in the longitudinal direction 36 and is spaced a good distance from wheel 54 in the longitudinal direction 36 so as to be located right next to the intermediate truck wheel 50. The faring 14 can be mounted onto the truck 12 by the mounting arm 74 or without the use of the mounting arm 74. The faring 14 can function in the same manners as previously described in which dual zones of air flow leaving the faring 14 can interact with portions of the truck 12, trailer 66 or trailer skirt 64 rearward of the faring 14. The aerodynamic system 10 may be arranged so that no portion of the faring 14 is located rearward of the intermediate truck wheel 50 in the longitudinal direction 36.

The trailer skirt 64 must be placed higher relative to the ground 70 in the vertical direction 38 than the fairing 14 due to the break over angle between the back tire wheel 44 and the trailer wheels 68. In this regard, since the fairing 14 is close to the back tire wheel 44 or the intermediate truck wheel 50, the fairing 14 will not require as much ground clearance as the trailer skirt 64 that is located between the much greater spaced wheels 44 and 68. Since objects are more likely to hit the trailer skirt 64 when the truck 12 travels into a loading dock, over a crest in a hill, out of a garage, etc. the trailer skirt 64 is located farther from the ground 70 than the fairing 14. As the trailer skirt 64 cannot deflect air that is below the trailer skirt 64 in the vertical direction 38, the fairing 14 may be used to deflect air at this vertical location.

The aerodynamic system 10 may be arranged so that the fairing 14 is configured relative to the trailer skirt 64 to achieve desired air flow deflection. As stated, the fairing 14 may be located lower than the trailer skirt 64 in the vertical direction 38 due to the break over angle, and the vertical locations of features of the fairing 14 such as the first kickout 22 and second kickout 28 may be oriented relative to the height of the trailer skirt 64 to achieve a desired air flow dynamic. The trailer skirt 64 has a lowest vertical height 78 that is the closest distance from the ground 70 to the trailer skirt 64. The second kick out 28 has an upper vertical height 80 that is the highest point in the vertical direction 38 of the second kick out 28 from the ground 70. The second kick out 28 is located below the trailer skirt 64 in the vertical direction 38 such that the lowest vertical height 78 is greater than the upper vertical height 80. With this configuration the second kick out 28 is used to direct air flow at these vertical heights as the trailer skirt 64 cannot do so.

The transition zone 40 has an upper vertical height 82 that is the farthest point of the transition zone 40 from the ground 70 in the vertical direction 38. The transition zone 40 is located at the bottom of the trailer skirt 64 in the vertical direction 38. The upper vertical height 82 may be greater than, the same as, or less than the lowest vertical height 78. The first kick out 22 can be designed to deflect air flow with the interaction of the trailer skirt 64 as these two component may be at the same height in the vertical direction 38. The upper vertical height 84 is the highest location of the first kick out 22 from the ground 70, and the upper vertical height 84 is greater than the lowest vertical height 78. The lowest point of the first kick out 22 from the ground 70 is at the upper vertical height 82, and this location is at or above the lowest vertical height 78.

The aerodynamic system 10 may be arranged to include both the fairing 14 and the trailer skirt 64, and the vertical locations of the first and second kick outs 22, 28 can be tied to the vertical locations of the trailer skirt 64 so that they interact with the presence and non-presence of the trailer skirt 64 in the vertical direction 38 to achieve a desired air flow. Although described as having the vertical distances linked with respect to the fairing 14 shown in FIG. 21, it is to be understood that any of the fairings 14 described in any of the included exemplary embodiments can be linked to the trailer skirt 64 to achieve a desired air flow.

The first and second kick outs 22, 28 are located closer to the back tire wheel 44 and the intermediate truck wheel 50 in the longitudinal direction 36 than to the front truck wheel 54. Although the kick outs 22, 28 may be located forward of the intermediate truck wheel 50 in the longitudinal direction 36, they are located proximate to the intermediate truck wheel 50 and more distant to the front truck wheel 54. The fairing 14 may be configured so that it is not immediately proximate to the front truck wheel 54. In instances where the truck 12 does not have an intermediate truck wheel 50, the kick outs 22, 28 are located closer to the back tire wheel 44 in the longitudinal direction 36 than they are to the front truck wheel 54.

Figure 23:
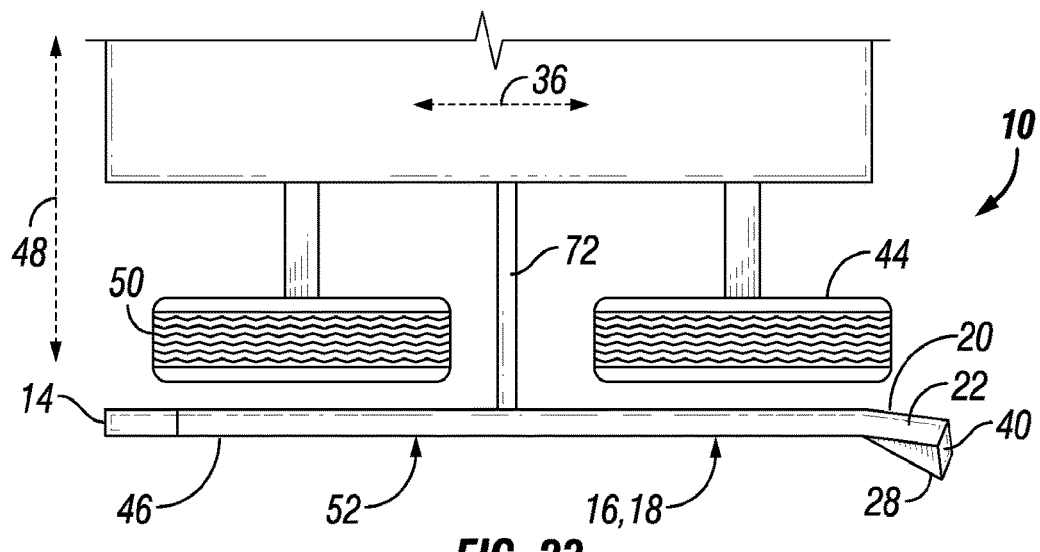
FIG. 23 is a top view of a portion of the aerodynamic system of FIG. 22.

Another version of the aerodynamic system 10 is shown with reference to FIGS. 22 and 23 in which the aerodynamic system 10 includes a truck skirt 46 that is located outboard from the intermediate truck wheel 50 and the back tire wheel 44 in the lateral direction 48. The truck skirt 46 covers the wheels 44, 50 and increases aerodynamic properties of the tractor trailer truck 12. The truck skirt 46 is located above the ground 70 in the vertical direction 38 and thus does not completely cover the wheels 44, 50 in all instances but instead leaves some of them exposed from the side. The truck skirt 46 can mount to the truck 12 via a mounting arm 72 or from any other mechanism. The truck skirt 46 extends forward of the intermediate truck wheel 50 but does not extend all the way to the front truck wheel 54 in the longitudinal direction 36. In other exemplary embodiments, the truck skirt 46 could in fact extend all the way to the front truck wheel 54 and cover the front truck wheel 54.

The faring 14 is incorporated into the truck skirt 46 so that it is located on the rear portion of the truck skirt 46. The faring 14 can be integrally formed with the truck skirt 46, or may be a separate component that is attached to the truck skirt or is located adjacent to the truck skirt 46. The truck skirt 46 has a truck skirt surface 52 that is oriented outboard in the lateral direction 48. Air flow may flow over the truck skirt surface 52 to the air flow surface 18 of the faring 14. There may be no discontinuities between the surfaces 52, 18 so that they are at the same location in the lateral direction 48. The air flow surface 18 may be located outboard from the back tire wheel 44 and forward from the back edge of the back tire wheel 44 so that the faring 14 is not located completely rearward of the back tire wheel 44 in the longitudinal direction 36. The faring 14 may feature the first and second kick outs 22, 28 as previously described. Air flow over the air flow surface 18 can engage the first and second kick outs 22, 28 and exit the faring 14 in dual zones. The faring 14 can be spaced from the trailer skirt 64 in the longitudinal direction 36.

Greater aerodynamic properties are achieved through the use of the truck skirt 46, but the presence of the truck skirt 46 adds weight to the truck 12 and covers the wheels 44, 50 and thus adds complexity and maintenance issues because the truck skirt 46 must be removed every time the wheels 44, 50 are serviced. The removal of the truck skirt 46 while maintaining the faring 14 results in a compromise in that maintenance issues are improved and aerodynamic properties are maintained.

In some embodiments, the bottom of the trailer skirt 64 is at a certain location in the vertical direction 38 from the ground 70. The second kick out 28 is at the bottom of the tailing end 20 and extends upwards in the vertical direction 38 to the same location in the vertical direction 38 from the ground 70 as the bottom of the trailer skirt 64. Here, the second kick out 28 is thus positioned vertically below any portion of the trailer skirt 64. The first kick out 22 is located in the vertical direction 38 at the same height as the trailer skirt 64. In other arrangements, the vertical heights of the first kick out 22 and second kick out 28 with respect to the vertical height of the trailer skirt 64 are not as previously discussed but are instead different. These vertical relationships can be as previously described, and it is to be understood that they may be present of desired in all embodiments of the aerodynamic system 10 that feature a skirt 64.

The first angle 26, second angle 32, and transition zone exit surface angle 60 can be the angles of the various surfaces 24, 30, 42 with respect to the air flow surface 18 or with respect to the longitudinal axis 34. If the air flow surface 18 is parallel to, or has a surface normal that is perpendicular to, the longitudinal axis 34 then the angles 26, 32, 60 may also be measured with respect to either the axis 34 or the surface 18. The aerodynamic system 10 has been described with respect to a faring 14 and trailer skirt 64 that are located on the left side of the truck 12 and trailer 66. However, it is to be understood that the aerodynamic system 10 can likewise include a faring 14 and trailer skirt 64 located on the right side of the truck 12 and trailer 66 in addition to the left side. The faring 14 can be arranged in a similar manner as described herein, and it is to be understood that the description with respect to use on the left side is simply for convenience and that a pair of farings 14 and associated components of the aerodynamic system 10 are present in other arrangements.

The faring 14 is located generally at the height of the wheels 44, 50, and 54. The front truck wheel 54 has an axis 86 about which it rotates, and the intermediate truck wheel 50 has an axis 88 about which it rotates. Likewise, the back tire wheel 44 has an axis 90 about which it rotates. At least one of the axes 86, 88, 90 is located at a height in the vertical direction 38 from the ground 70 that is common to some portion of the faring 14. In this regard, at least one of the axes 86, 88, 90 does not extend a greater distance in the vertical direction 38 from the ground 70 than the faring 14, and the faring 14 includes portions that are at or below at least one of the axes 86, 88, 90.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An aerodynamic system for a truck, comprising:
a faring that is carried by the truck, wherein the faring has an outer surface that is an air flow surface across which air flows when the truck is moving forward, wherein the faring has a tailing end that has a first kick out, wherein the first kick out has a first kick out exit surface oriented at a first angle with respect to the air flow surface, wherein the tailing end has a second kick out, wherein the second kick out has a second kick out exit surface oriented at a second angle with respect to the air flow surface, wherein the first angle is different than the second angle;
wherein the truck has a longitudinal axis, wherein the truck has a longitudinal direction and a vertical direction, wherein the air flow surface is located forward from the tailing end in the longitudinal direction, wherein the first kick out is located higher than the second kick out in the vertical direction, wherein the truck has wheels that roll on the ground, wherein of the wheels that roll on the ground the first and second kick out are located in the longitudinal direction farthest from a front truck wheel of the wheels that roll on the ground, wherein the wheels that roll on the ground each have an axis, and wherein a portion of the faring is located at a height in the vertical direction from the ground that is the same as a height in the vertical direction from the ground as at least one of the axes of the wheels that roll on the ground.

2. The aerodynamic system as set forth in claim 1, further comprising a trailer skirt that is attached to a trailer that is attached to the truck, wherein the trailer skirt is located completely rearward of the faring in the longitudinal direction, wherein the trailer skirt has a lowest vertical height that is the distance in the vertical direction from the ground to the closest portion of the trailer skirt.

3. The aerodynamic system as set forth in claim 2, wherein the entire first kick out has a height from the ground in the vertical direction that is at least the same height or higher as the lowest vertical height of the trailer skirt, and wherein the entire second kick out has a height from the ground in the vertical direction that is at least the same height or lower as the lowest vertical height of the trailer skirt.

4. The aerodynamic system as set forth in claim 2, wherein the tailing end has a transition zone, wherein the transition zone has a transition zone exit surface that extends in the vertical direction between the first kick out exit surface and the second kick out exit surface, wherein the transition zone is located in the vertical direction from the ground at a height that is at the trailer skirt that is at the lowest vertical height.

5. The aerodynamic system as set forth in claim 1, wherein the tailing end has a transition zone, wherein the transition zone has a transition zone exit surface that extends in the vertical direction between the first kick out exit surface and the second kick out exit surface.

6. The aerodynamic system as set forth in claim 5, wherein the second kick out exit surface is located at a bottom terminal end of the tailing end, wherein the transition zone exit surface is oriented at a transition zone exit surface angle to the air flow surface that changes at a constant rate in the vertical direction from the second kick out exit surface to the first kick out exit surface.

7. The aerodynamic system as set forth in claim 5, wherein the first kick out exit surface is located at a top terminal end of the tailing end, wherein the transition zone exit surface is oriented at the transition zone exit surface angle to the air flow surface that changes at a constant rate in the vertical direction from the first kick out exit surface to the second kick out exit surface.

8. The aerodynamic system as set forth in claim 5, wherein the second kick out exit surface is located at the bottom terminal end of the tailing end, wherein the transition zone exit surface is oriented at the transition zone exit surface angle to the air flow surface that is different at different locations in the vertical direction from the second kick out exit surface to the first kick out exit surface.

9. The aerodynamic system as set forth in claim 1, wherein the first angle is greater than the second angle.

10. The aerodynamic system as set forth in claim 9, wherein the first angle is from 170 degrees to 175 degrees, and wherein the second angle is from 157 degrees to 170 degrees.

11. The aerodynamic system as set forth in claim 1, wherein the outer surface and the tailing end are both completely located rearward of a back tire wheel of the truck in the longitudinal direction.

12. The aerodynamic system as set forth in claim 1, further comprising a truck skirt that is located outboard from an intermediate truck wheel and a back truck wheel of the truck in a lateral direction of the truck, wherein the truck skirt partially covers the intermediate truck wheel and the back truck wheel, wherein the faring is located rearward of the truck skirt in the longitudinal direction, wherein the truck skirt has a truck skirt surface that is integrally formed with the air flow surface of the faring.

13. The aerodynamic system as set forth in claim 1, wherein the outer surface and the tailing end are both completely located rearward of the front truck wheel of the truck in the longitudinal direction, and wherein the outer surface and the tailing end are both completely located forward of an intermediate truck wheel of the truck in the longitudinal direction.

14. The aerodynamic system as set forth in claim 1, wherein the first kick out exit surface extends from the air flow surface to a terminal end of the tailing end, wherein the first kick out exit surface is oriented at the first angle all the way from the air flow surface to the terminal end of the faring, wherein the second kick out exit surface extends from the air flow surface to the terminal end of the tailing end, wherein the second kick out exit surface is oriented at the second angle all the way from the air flow surface to the terminal end of the faring.

15. The aerodynamic system as set forth in claim 1, wherein the air flow surface is parallel to the longitudinal axis.

\* \* \* \* \*